April 7, 1970 J. T. QUATSE 3,505,474

PORTABLE COMPUTER TERMINAL USING DIGITAL CODE OVER CONVENTIONAL TELEPHONE CHANNEL

Filed March 6, 1967 4 Sheets-Sheet 1

April 7, 1970 J. T. QUATSE 3,505,474

PORTABLE COMPUTER TERMINAL USING DIGITAL CODE OVER CONVENTIONAL TELEPHONE CHANNEL

Filed March 6, 1967 4 Sheets-Sheet 2

United States Patent Office 3,505,474
Patented Apr. 7, 1970

3,505,474
PORTABLE COMPUTER TERMINAL USING DIGITAL CODE OVER CONVENTIONAL TELEPHONE CHANNEL
Jesse T. Quatse, Pittsburgh, Pa., assignor to VDP Corporation, Farmingdale, N.Y., a corporation of New York
Filed Mar. 6, 1967, Ser. No. 620,760
Int. Cl. H04m *11/00, 11/08*
U.S. Cl. 179—3 6 Claims

ABSTRACT OF THE DISCLOSURE

A portable computer terminal for communicating with a distant computer over conventional telephone channels via a standard telephone. This is accomplished in the terminal by the user requesting information by converting the question to be asked into teletypwriter code and transmitting this code via the telephone and telephone channel to the computer. The requested information is then transmitted from the computer in the code form and received by the terminal and demodulated to be visually displayed for the user.

BACKGROUND OF THE INVENTION

The present invention relates to computer terminals and, more particularly, to portable computer terminals operative over conventional telephone channels via a standard telephone to transmit and receive information from a central computer.

Computers have become a practically indispensible tool in esentially all disciplines and particularly those requiring access to large quantities of information or involving mathematical analysis. A principal drawback to the even greater use of general purpose computers is the lack of ready access thereto by a great many potential users. The inaccessability may be due to economic reasons. The cost may be reduced by recently developed time-sharing techniques for operating a central computer unit. Nonetheless, this does not solve the problem of a user transmitting information to the computer to enable it to supply the desired return information, which must, by some means, be transmitted back to the user.

It thus would be highly desirable if a computer terminal could be provided for a user which would provide practically immediate access to the full programming power of a computer, which might be located at a distant computer center. Full programming power requires full page print-out and full alpha-numeric type in. A user could thus be capable of programming the computer via the terminals requesting information from the computer via the terminal, and receiving the requested information at the terminal. Computer terminals which provide full programming capability have been provided which permit access to a distant computer; however, these terminals require a direct tie-in with the computer through, for example, a direct and permanent connection into telephone cables of a telephone network. Moreover, the equipment required in such terminals is not intended to be portable being relatively complex, large in size and heavy.

A highly useful terminal would thus be one which would be portable in nature, while permitting ready access to a central computer, full alpha-numeric input to the computer, and a visual full-page read-out of the requested information. Such a portable terminal would be increasingly attractive if correspondence with the computer could be effected over conventional telephone channels via a standard telephone. This essentially would provide access to the computer from the desk of the user.

SUMMARY OF THE INVENTION

It is, therefore, an object of the present invention to provide a new and improved portable computer terminal.

It is a further object to provide a new and improved portable computer terminal operative over conventional telephone channels via a standard telephone.

It is a further object to provide a new and improved portable computer terminal which provides user access to a distant computer center and provides a full-page visual read out to the user of the received information.

It is a further object to provide a portable computer terminal operative over conventional telephone channels via a standard telephone which uses standard teletypewriter codes for the transmission and reception of information.

It is an additional object of the present invention to provide a portable computer terminal utilizing therein a new and improved demodulator permitting the use of the terminal over poor quality telephone channels.

It is a still additional object to provide a portable computer terminal utilizing a new and improved audio detector for sensing that extraneous information is being received by the terminal.

It is a further object to provide a portable computer terminal which utilizes a new and improved low-ripple content power supply which enhances the portability of the terminal due to its light weight.

It is a still further object to provide a portable computer terminal operative over conventional telephone channels via a standard telephone which utilizes a new and improved automatic answering mechanism which automatically answers the telephone when information is to be received from a distant computer.

Broadly, the above cited objects are accomplished by providing a new and improved portable computer terminal for communicating with a distant computer over conventional telephone channels via a standard telephone. The terminal accomplishes this by the user requesting information by converting the question to be asked into code form and transmitting the code via the telephone and telephone channel to the computer. The requested information is then transmitted from the computer in code form and received by the terminal and demodulated to be visually displayed for the user.

In addition, a demodulator is provided in the portable computer terminal which is responsive to the received code to filter out substantially all extraneous signals and to provide detected signals indicative of the received information that is in a suitable form to be utilized by the display means of the terminal.

Also, a new and improved power supply is provided for the portable computer terminal wherein a low-ripple content output is supplied and wherein the weight and cost of filtering required is reduced by placing the filter in a feedback loop of the power supply circuitry.

As a further feature for use in the portable computer terminal, a unique voice detection circuit is provided to sense when extraneous signals outside a given bandwidth are received.

A new and improved automatic answering device is moreover provided for use in the portable computer terminal. This device is in response to the proper time sequence of ringing and silence and answers automatically the associated telephone of the terminal to receive incoming information.

BRIEF DESCRIPTION OF THE DRAWINGS

These and other objects and advantages of the present invention will become more apparent when considered in view of the following specification and drawings in which.

DESCRIPTION OF THE PREFERRED EMBODIMENT

Computer terminal

Figure 1:
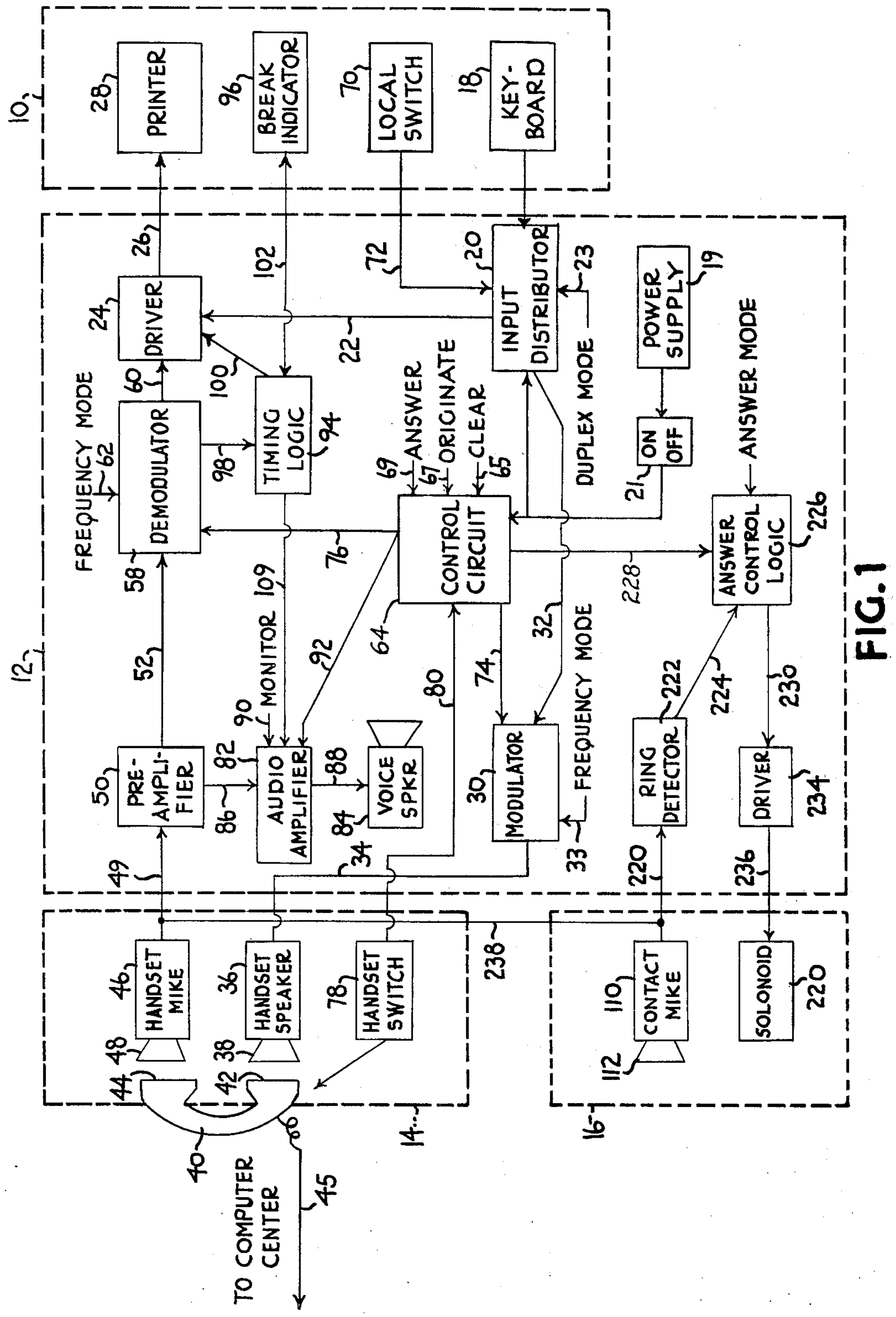
FIGURE 1 is a block diagram of the portable computer terminal of the present invention.

Referring to FIG. 1, a block diagram of the preferred embodiment of the present invention is shown. The portable computer terminal shown in FIG. 1 is broken down into functional groups including: a portable teletype terminal, indicated by a dotted box 10; a control console, indicated by a dotted box 12; a handset receptacle, indicated by a dotted box 14; and an auto-answer mechanism, indicated by a dotted box 16. Assume initially for the purposes of explanation that a communicative linkup has been established between the portable computer terminal shown in FIG. 1 and a distant computer center. Assume further that it is desired to send information from the computer terminal either in the form of a question to be asked of the computer center or a program to be applied to the computer.

A keyboard 18 is provided in the teletypewriter terminal 10. This keyboard 18 may comprise the standard alphabet and numerical keys as well as additional keys according to the type of information that is to be inputted into the computer terminal. The depressing of the various keys of the keyboard activates electrical contacts to produce a teletypewriter code as is well known in the art. The opening and closing of the various contacts in response to the depressing of particular keys corresponds respectively to the mark and space teletypewriter functions. By the depressing of the proper keys of the keyboard 18, information can be applied to the computer terminal which may then be transmitted to a distant computer center. Operating power for the portable computer terminal is provided by a power supply 19. An on-off switch 21 is operative to open or close a circuit between the power supply 19 and an input distributor 20. The output of the keyboard 18 is applied to the input distributor 20, which may be operative in either a full or a half duplex mode. A duplex input 23 is provided to the input distributor 20 to select the desired mode of operation. Assuming initially that the half duplex mode has been selected, an output connection 22 of the input distributor 20 is completed to a driver 24. The output 26 of the driver 24 is applied to a printer 28, which may be a standard printer of a teletypewriter unit, and which in response to the output of the driver 24 provides a typewritten display of the input information as it is inputted through the keyboard 18. The operator of the keyboard 18 thus has an immediate visual display of the information inputted into the keyboard, which is, in many instances, essential to the proper asking of a question to the computer center or the programming of the distant computer. In the full duplex mode of operation the connection 22 between the input distributor 20 and the driver 24 is not made. Thus, in the full duplex mode the information inputted into the keyboard is not printed out.

A modulator 30 is provided which receives as an input connection 32 thereto from the input distributor 20. The modulator 30 is responsive to the contact opening and closures of the keyboard 18 which are translated through the input distributor 32 to the modulator 30. The modulator 30 acts as a frequency-shift modulator and provides audio-frequency space signals at a frequency of, for example 1070 cycles per second (c.p.s.), in response to contact closures and is frequency-shifted to provide audio-frequency mark signals at, for example 1270 c.p.s., in response to contact openings. The normal mark and space frequencies can be reversed to provide an inverted mode of operation, so that the space frequency is 1270 c.p.s., and the mark frequency is 1070 c.p.s. A frequency mode input 33 is provided to the modulator 30 to accomplish the setting of the normal or inverted mode of operation for the modulator 30. The audio-frequency mark and space signals are taken from an output 34 of the modulator 30 and applied to a handset speaker 36 of the handset receptacle 14.

The handset speaker 36 provides audio-frequency output sounds in response to the audio-frequency electrical signals applied from the modulator 30 and, as such, acts as a conventional electro-acoustical converter. The handset speaker 36 has an audio output cradle 38, which is adapted to receive the microphone portion of a conventional telephone handset. A conventional telephone handset 40 is shown in FIG. 1 having a microphone portion 42 and a speaker portion 44. The microphone portion 42 is disposed adjacent the cradle 38. By this arrangement, the audio-frequency sounds produced by the handset speaker 36 are acoustically coupled to the microphone 42 of the handset 40 and are then transmitted over a conventional telephone channel indicated by a line 45, which will transmit the audio-frequency signals from the telephone microphone 42 to a computer center. It is assumed, of course, that the computer center is adapted to receive such telephone communications. The information transmitted to the computer center is indicative of the originally inputted information at the teletypewriter and, therefore, may be utilized to either ask the computer a question in accordance to an already existing program, or it may serve to program the computer according to a desired plan of the sender of the information.

In response to the information provided to the computer center from the computer terminal, information will in turn be supplied by the computer center through the conventional telephone channel 45 to the telephone handset 40. This information will be similarly coded in a conventional teletype code and may be at a frequency of 2025 c.p.s. as the answering space and at a frequency of 2225 c.p.s. as the answering mark. Alternately, the frequency of 2225 c.p.s. may be used as the answering space and 2025 c.p.s. as the answering mark if the inverted frequency mode is utilized. The audio-frequency answer mark and space electrical signals are converted to audible sounds in the speaker portion 44 of the conventional handset 40. The speaker portion 44 is acoustically coupled to a handset mike 46 of the handset receptacle 14 through an audio input cradle 48 thereof, which is adapted to receive the speaker portion 44 of the handset 40. The handset mike 46 operates conventionally as an audio-electrical converter to supply audio-frequency electrical signals at an output 49. The output at the lead 49 will be electrical signals at a frequency rate corresponding to the answer mark and space frequencies. A preamplifier circuit 50 is provided to receive the audio-frequency mark and space signals from the output lead 49 and amplify these signals. The signals are taken from an output 52 of the preamplifier 50 and applied to a demodulator 58. The demodulator 58 provides unidirectional signals therefrom at an output 60 in response to the respective mark and space frequency signals inputted thereto. A frequency mode input 62 is provided for the demodulator 58 so that the normal or inverted mode of operation may be selected.

The unidirectional output signals of the demodulator 58 correspond to the mark and space coding of the teletypewriter code. These are applied to the driver 24 and are applied in the time sequence of the teletypewriter code to activate the selector magnets of the printer 28 of teletypewriter terminal 10. In response thereto, the letters and numbers corresponding to the code are printed out on the printer 28 of the teletypewriter terminal 10.

The operation as thus described has been made under the assumption that a communicative linkup has been achieved between the remote computer terminal and the computer center.

In order to set up the apparatus initially various logical functions must be performed. To establish the desired operative condition of the computer terminal, a control circuit 64 is provided which has as inputs thereto: a clear input 65, an originate input 67, and an answer input 69. Also a local-line switch 70 is provided in the teletypewriter terminal 10 with a connection 72 to the input distributor 20 whose function is to permit the information inputted on the keyboard 18 to be transmitted over the telephone line to the computer center. If the local-line switch 70 is placed in its local position, any information inputted into the keyboard 18 will be applied only locally to the input distributor 20, the driver 24 and the printer 28, which will type out this information that may be desired for test purposes. If, however, the local-line switch 70 is placed in its line condition, distributor 20 will be set up to permit the contact opening and closing information of the keyboard 18 to be translated thereto to the modulator 30 for subsequent transmission to the computer center. Operating power from the power supply 19 is also supplied to the control circuit through the on-off switch 21.

When it is desired to establish initially a communicative link between the remote computer terminal apparatus and the computer center, the clear mode is set up on the control circuit 64 via the clear input 65. An output connection 74 is thereby made from the control circuit 64 to the modulator 30 to establish the proper transmit operative condition therein, and an output connection 76 is made to the demodulator 58 to establish the proper receive condition therein.

The placement of the handset 40 into the cradles 38 and 48 causes a handset switch 78 to be actuated, with this actuation being connected to the control circuit 64 via an output connection 80 from the handset switch 78. This, in essence, tells the control circuit that the handset has been properly disposed to permit communications to the computer center. It is, of course, assumed that the telephone corresponding to the handset 40 and the computer center, are in telephone communications via the conventional telephone channel 45.

To proceed with the original set-up operation, a linkup code signal is inputted into the keyboard 18 and translated through the input distributor 20 to the modulator 30 wherein it is modulated according to a frequency-shift modulation and applied to the handset speaker 36. The linkup signal code is then transferred to the computer center via the handset 40 and telephone channel 45. The computer center receives this information, and, in response thereto, it transmits the necessary computer linkup code through the telephone channel 45 to the handset 40. This information is then applied to the handset mike 46 and, as previously described, is applied to the preamplifier 50 and demodulator 58 of the computer terminal. This information is demodulated to usable mark and space information therein and applied through the driver 24 to the printer 28 to indicate with a visual readout that the computer has received the linkup code from the computer terminal and information may be transmitted by the computer terminal to the computer center for action thereby.

After the clear operation has been effected in the computer terminal, the originate input 68 may be inputted into the control circuit 64, which establishes the proper conditions in the modulator 30 via the connection 74 and the demodulator 58 via the connection 76 for the transmission from the keyboard 18 of information to the computer center as previously described.

Another independent mode of operation, called the answer mode, may be set up in the computer terminal shown in FIG. 1. If a call from the computer center is received through the telephone associated with the handset 40, the answer input 69 to the control circuit 64 is activated by the terminal operator. Then the handset 40 is placed on the cradles 38 and 48 of the handset receptacle 14. By the activation of the answer input 69 to the control circuit 64, the demodulator 58 via the connection 76 is activated to be operative to demodulate information transmitted from the computer center, which is, in turn, printed out by the printer 28 as previously explained.

If it is desired to monitor incoming information at the portable computer terminal from the computer center an audio monitoring circuit is provided including an audio amplifier 82 and a voice speaker 84. The audio amplifier 82 is driven by the preamplifier 50 through an output 86 thereof. The audio amplifier 82 in turn drives the voice speaker 84 through an output 88 with sound being supplied by the voice speaker 84. In order to activate the audio amplifier 82, a monitor input 90 is provided thereto, and also a connection 92 is made from the control circuit 64. The audio monitoring circuit provides a convenient way of monitoring the information being transmitted from the computer center prior to entering the output 52 and subsequent stages.

To indicate that a particular message has ended, a break-code signal is transmitted by the transmitting facility to the receiving facility. This signal typically a mark signal of a predetermined time length. In the computer terminal of the present circuit, a timing logic circuit 94 and a break indicator circuit 96, within the teletypewriter terminal 10, are provided to indicate that a break signal has been received. The demodulator 58 has an output 98 which is supplied to the timing logic circuit 94. Upon the reception of a break signal, the timing logic circuit 94 will supply an output via connection 100 to the driver 24 to deactivate the driver so that no signals are then applied to the printer 28. Also, the timing logic circuit 94 will activate the break indicator 96 via a connection 102, which will indicate to the user of the portable computer terminal that a break signal has been received and the information being transmitted from the computer center has been terminated. The timing logic circuit 94 also has an output 109 which is applied to the audio amplifier 82 which will deactivate this amplifier if it has been previously set to its monitoring condition. The computer terminal thus automatically upon the reception of a break signal will be deactivated.

The automatic answer mechanism 16 includes a contact microphone 110 having a handset receptacle portion 112. The contact mike 110 and receptacle portion 112 are so designed to be disposed adjacent the speaker portion 44 of the handset 40 whenever the handset is placed on the cradle of the telephone in its unused condition. A solenoid 220 is also provided which is disposed adjacent the handset 40 and upon energization will cause the handset to be removed from the contacts which are usually depressed by the handset when in the cradle of the telephone. Upon the release of the contacts, effectively taking the handset out of the cradle, the circuit is completed from a distant transmitting facility to the local telephone.

The contact mike 110 is connected via a lead 222 to a ring detector 220. If the telephone rings when the handset is in contact with the contact mike 110 the ringing signals are applied to the ring detector 222, which gives an output at a lead 224 in response thereto. This output at the lead 224 is supplied to an answer control logic circuit 226. Whenever the apparatus shown in FIG. 1 is in an answer state an input is supplied through a lead 228 from the control circuit 64 to the answer control logic circuit 226 so as to place this circuit in the proper condition to effect the automatic answering feature of the present apparatus. The answer control logic circuit 226, in response to a ring signal being detected in the ring detector 222, supplies an output at a lead 230 which is supplied to a driver 234 that amplifies this signal and supplies the solenoid 220 via an input 236 thereto. The solenoid 220 in response to the signal from the driver 234 is activated and through its plunger mechanically removes the handset 40 from the cradle contacts of the telephone so as to close the circuit between the distant computer center and the local apparatus. When this circuit is closed, information may be transmitted from the handset 40 to the contact mike 110 which has an output 238 connected to the lead 49, which is then applied to the preamplifier 50. With the circuit being completed between the computer center and the portable computer terminal, the operation of the circuit will be as previously described to receive, demodulate and print out the incoming information.

Power supply circuit

Figure 2:
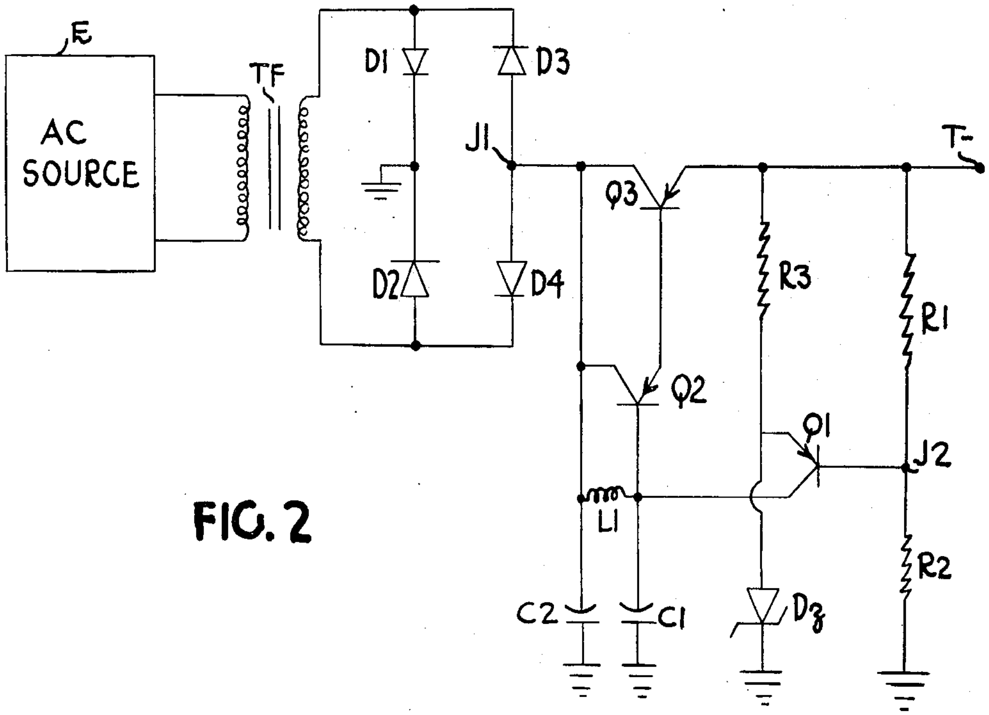
FIG. 2 is a schematic diagram of a power supply suitable for use in the computer terminal.

Referring now to FIG. 2 there is shown a schematic diagram of a power supply circuit which is light weight and provides an extremely low ripple content output. The circuit shown in FIG. 2 may be utilized as the power supply 19 shown in block form in FIG. 1. It is highly desirable to provide such a power supply for use with the apparatus shown in FIG. 1. It is especially important that the power supply be light in weight because of the portable nature of the apparatus. The usual method of reducing ripple in a power supply is to place a filter in series with the output load. This filter would include an inductor connected directly in series with the output load and would have to have a current capacity equal to that of the load. This necessitates the use of a relatively large, heavy and expensive choke.

The power supply circuit shown in FIG. 2 eliminates the necessity of such a choke in series with the output load by placing an inductor in the feedback circuit of the power supply. The feedback inductor may be substantially smaller in size and weight and may have a much lower current rating. This may be seen from the following. The AC input for the power supply circuit shown in FIG. 2 is supplied from an AC source E, which may have a 60 c.p.s., 120 volt output, for example. The AC output of the source E is coupled through a primary winding of a transformer TF to the secondary winding thereof. Across the secondary winding of the transformer TF is connected a full wave rectifying bridge including diodes D1, D2, D3 and D4. The cathode electrodes of the diodes D1 and D2 are commonly connected to ground, and the anode electrodes thereof are connected respectively across the secondary winding of the transformer TF. The cathodes of the diodes D3 and D4 are, respectively, connected across the secondary of the transformer TF, while the anodes thereof are commonly connected at a junction point J1.

The output from the power supply circuit, which may nominally be −12 volts, is taken from an output terminal T−. Between the output terminal T− and ground is connected a voltage divider circuit including a resistor R1 and a resistor R2. The base electrode of a transistor Q1 is connected to a junction point J2 between the resistors R1 and R2. The emitter electrode of the transistor Q1 is connected through a resistor R3 to the output terminal T− and is also connected through a Zener diode Dz to ground. The Zener diode Dz is selected to hold the emitter electrode at a fixed reference potential. The collector electrode of the transistor Q1 is connected to a filter circuit including an inductor L1 and a pair of filter capacitors C1 and C2. The capacitors C1 and C2 are connected from the opposite ends of the inductor L1 to ground, with one end of the inductor L1 being connected to the collector electrode of the transistor Q1. The other end of the inductor L1 is connected to the junction point J1. The collector of the transistor Q1 is also connected to the base electrode of a transistor Q2 which is included in a Darlington amplifier comprising the transistor Q2 and a transistor Q3. The collectors of the transistors Q2 and Q3 are connected to the junction point J1, while the base electrode of the transistor Q3 is connected to the emitter electrode of the transistor Q2. The emitter electrode of the transistor Q3 is connected to the output terminal T−.

Regulation in the power supply circuit is obtained by comparing the feedback voltage appearing at the base of the transistor Q1 with the reference voltage determined by the Zener diode Dz at the emitter electrode of the transistor Q1. The direct current passing through the inductor L1 is amplified by the Darlington amplifier including the transistors Q2 and Q3 and is supplied to the load, not shown, to be connected to the output terminal T−.

The operation of the power supply circuit is such that: if the output voltage at the terminal T− becomes more positive than desired the voltage, the junction J2 at the base of the transistor Q1 also becomes more positive. This causes the collector of the transistor Q1 to become more negative which causes more current to flow in the transistors Q2 and Q3 causing the voltage at the terminal T− to be driven in a negative direction toward its desired value. Conversely, if the voltage at the junction J2 should become more negative than desired, the voltage at the collector of the transistor Q1 appears more positive due to clamping action of the Zener diode Dz on the emitter electrode of the transistor Q1, which, in turn, causes less current to flow through the transistors Q2 and Q3 and causes the output at the terminal T− to be driven positively and be returned to its desired value.

Since all the base current for the transistors Q2 and Q3 passes through the feedback inductor L1, the ripple content appearing at the load terminal T− is substantially reduced in a similar fashion as would be the case if a large current capacity choke were connected in series with the terminal T−. The ratio of ripple to DC voltage at the emitter of the transistor Q3 cannot exceed the same ratio at the base of the transistor Q2, with this ratio being small due to the filter inductor L1 being so connected in the feedback path.

Circuit components which provide a 0 to 1 ampere output with a DC regulation of 1% and having a ripple of less than 2 millivolts R.M.S. at 1 ampere are as follows:

Transistors:
- Q1—2N508A
- Q2—2N3213
- Q3—2N1073

Resistors:
- R1—150 ohms
- R2—230 ohms
- R3—20 ohms

Inductor L1—30 H, 700 ohms, 30 ma.

Capacitors:
- C1—1000 mf./15 v.
- C2—1000 mf./50 v.

Diodes:
- D1, D2, D3, D4—1N1124A
- Dz—1N1603A

The voltage output at the terminal T− is nominally −12 volts.

Demodulator block diagram

Figure 3:
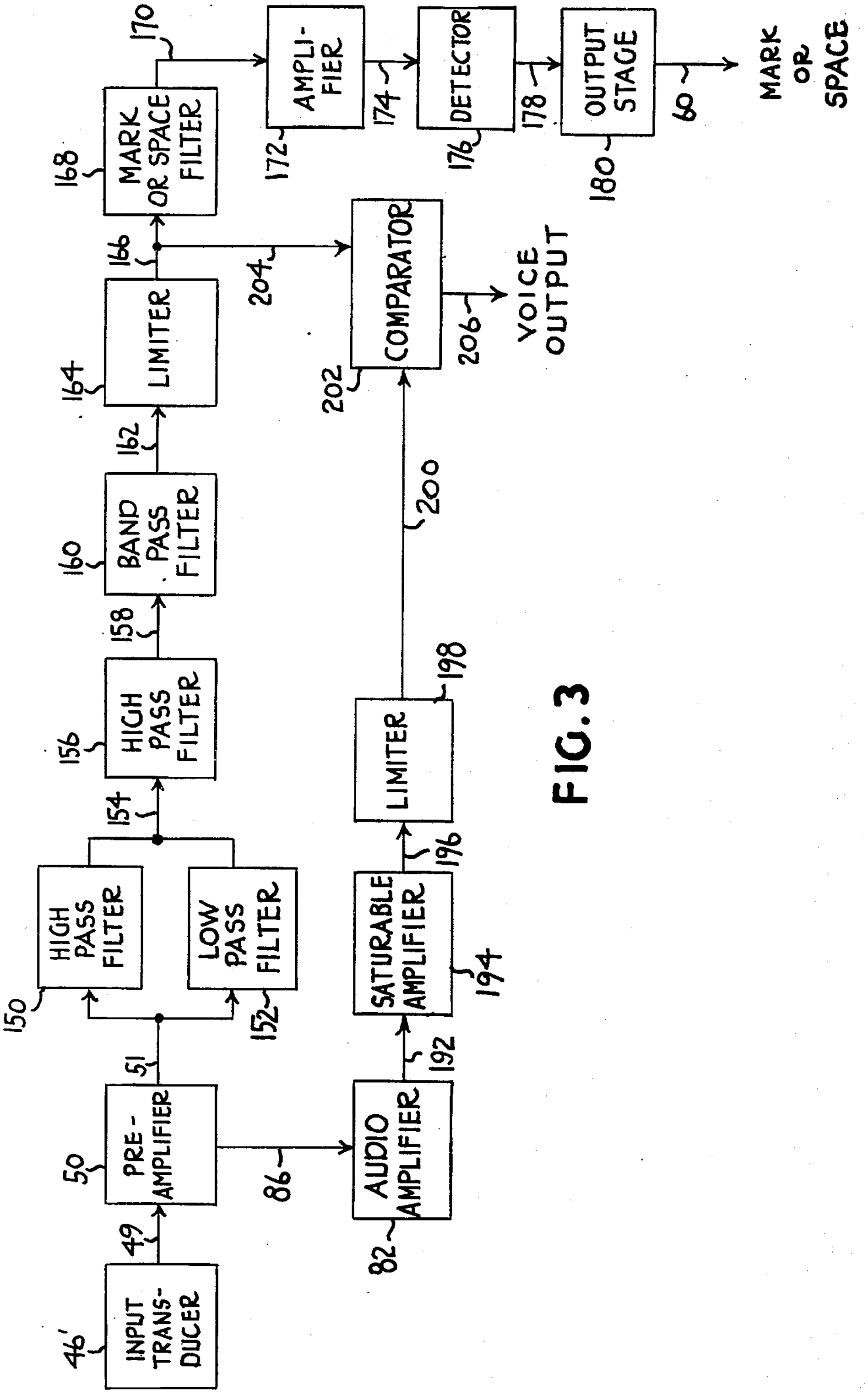
FIG. 3 is a more complete block diagram of the demodulator shown in FIG. 1.

FIG. 3 shows a more detailed block diagram of the demodulator 58 of FIG. 2. Incoming mark and space frequency information from the distant computer center is received and applied to an input transducer 46′, which may comprise the handset microphone 46 as shown in FIG. 2. The output of the transducer 46′ is applied via lead 49 to the preamplifier circuit 50. The output 51 of the preamplifier 50 is then applied to the first stage of the demodulator which includes a high pass filter 150 and a low pass filter 152. The filters 150 and 152 are connected in parallel so that they each receive the input 51 thereto and have their outputs commonly connected to a lead 154. The high pass filter 150 is selected to have a characteristic so as to pass frequencies above approximately 1500 c.p.s. while rejecting frequencies below approximately that frequency. The low pass filter 152 is selected to pass frequencies substantially unattenuated below 1500 c.p.s. while rejecting frequencies above 1500 c.p.s. The common output 154 of the high pass filter 150 and low pass filter 152 is applied to a high pass filter 156 which is selected to have a characteristic of passing all frequencies above approximately 1000 c.p.s. and rejecting frequencies below 1000 c.p.s. The output of the high pass filter 156, appearing at a lead 158, has been found to have approximately a 60 db attenuation for frequencies not within the desired frequency spectrum. The mark and space information at the lead 158 within the selected pass frequency range of 2025–2225 or 1070–1270 c.p.s. will however appear at the lead 158 substantially unattenuated. The mark and space frequency signals are then applied to a band pass filter 160 which is selected to have a band pass of slightly larger than 200 c.p.s. centered between the mark and space frequencies. The center of the band pass for the band pass filter 160 is thus selected to be either 2125 c.p.s. for reception of 2025–2225 c.p.s. mark and space frequencies or at 1170 c.p.s. for reception of 1070–1270 mark and space frequencies.

The output of the band pass filter 160 at a lead 162 provides a further 3 db attenuation of signals outside the desired frequency range. It can thus be seen that the output of the band pass filter at lead 162 is substantially free of extraneous frequency signals outside of the desired mark and space frequency range. This permits the use of the presently described portable computer terminal even on poor telephone channels which contain large amounts of extraneous signals and noise.

A limiter 164 receives the output 162 of the band pass filter 160 and limits the amplitude of the mark and space frequency signals applied thereto to a predetermined amplitude level and supplies this at an output 166. The mark and space frequency signals appearing at the lead 166 are applied to a mark or space filter 168 at substantially the same amplitude level. The mark or space filter 168 is selected to have a characteristic to pass the mark frequency and reject the corresponding space frequency or to pass the space frequency and reject the corresponding mark frequency depending upon the mode of operation selected. Thus, a substantially unattenuated mark or space frequency appears at an output 170 of the mark or space filter 168, while the corresponding space or mark frequency signal has been substantially eliminated thereby. The mark or space frequency signals on the lead 170 are applied to an amplifier 172 wherein they are amplified and appear at an amplified level at a lead 174 of the amplifier 172. The signals at the lead 174, which are at either the mark or space frequency, are applied to a detector 176 wherein they are converted to detected unidirectional signals which appear at the output 178 of the detector 176. The detected mark or space frequency signals are then applied to an output stage 180 for amplification, with the mark or space signal appearing at the output 60 thereof, corresponding to the output 60 in FIG. 1. The detected mark or space frequency signals at the lead 60 may be applied to an inverter if the inverted mode of operation is desired.

The output 60, as shown in FIG. 1, is then applied to the driver 24 and, in turn, is applied via the lead 26 to the printer 28 of the teletypewriter terminal 10. The information contained in the detected mark or space frequency signals is indicative of the information that has been transmitted by the computer center which will be printed out on the printer 28.

It is often desirable to monitor the input information being received by the input transducer 46' to determine if audio information is being transmitted over the particular telephone channel in use. This is accomplished by taking a separate output 86 from the preamplifier 50 with this output being applied to the audio amplifier 82, with an amplified audio output appearing at the lead 88, which may be converted into audible sound via a voice speaker 84 as shown in FIG. 1. Moreover, it is desirable to have an automatic indication of whether audio information is being transmitted over the telephone channel in use or to determine if noise or other interfering signals are present in the telephone channel. A voice detector circuit is included in the block diagram shown in FIG. 3 to give an automatic indication of whether audio-frequency signals, such as voice or noise signals, appear in the input information as received by the transducer 46'. This automatic indication is provided in the following manner.

The output of the audio amplifier 82 is applied via a lead 192 to a saturable amplifier 194, which, in response to the information applied thereto, provides a substantially square wave output at the frequency of the incoming information at an output 196. The output 196 is applied to a limiter 198 wherein it is limited to a predetermined amplitude independent of its original input amplitude. The limited output is then applied via a lead 200 to a comparator 202. The other input to the comparator 202 is applied from a lead 204 which is connected to the output 166 of the limiter 158 in the demodulated channel. As previously explained, the output of the limiter 164 is amplitude limited to a predetermined amplitude. However, due to the filters appearing before the limiter 164 in the demodulator channel, frequencies other than the received mark and space frequencies have been eliminated from the information appearing at the input 162 of the limiter 164. Thus, the signals appearing on the lead 204 include only mark and space frequencies, while those appearing at the lead 200 will contain all frequencies originally appearing in the input information on the telephone channel.

The comparator 202 is designed to provide an output at a lead 206 only when the signals appearing at its respective inputs 200 and 204 are out of phase with each other. In the normal situation, when only mark and space frequencies are being transmitted over the telephone channel, the inputs 200 and 204 will be in phase with each other, because they will be indicative of the same information at a given instant of time, that is, either a mark or a space. However, should voice or other information also be present on the telephone channel, non mark and non space frequency signals will be filtered out in the demodulator channel. Nonetheless, the voice information will be translated through the voice detector channel including the limiter 198. Whenever the voice information appears at the lead 200, there will be a lack of phase correlation between the information at the lead 200 and the lead 204. This will cause the comparator 202 to provide an output 206, which thus gives an indication that voice or other non mark or non space information appears on the telephone channel. In response to such an indication, the audio information may be monitored, for example, via the output 88 as previously described. Whenever the non mark or non space information is no longer present on the telephone channel, phase synchronization will again exist between the inputs 202 and 204 to the comparator 202; therefore, no output indication will be provided at the lead 206 indicating that normal mark and space frequency transmission is in progress.

Amplifier, detector and output stage schematic

Figure 4:
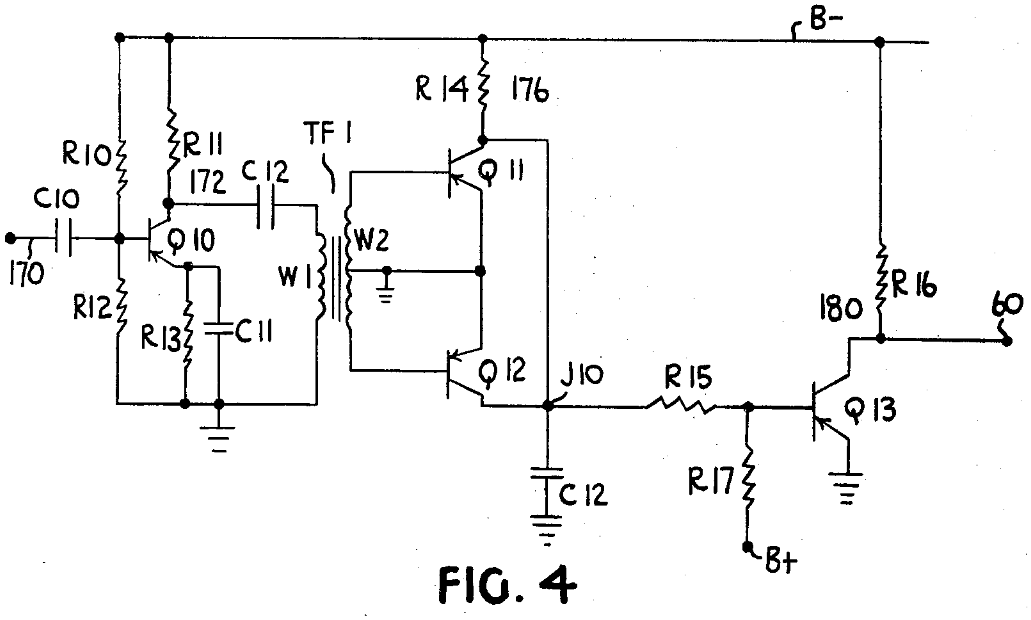
FIG. 4 is a schematic diagram of the detector as shown in FIG. 3.

Reference is now made to FIG. 4 which is a schematic diagram of the circuitry for the amplifier 172, detector 176 and output stage 180 shown in block form in FIG. 3. Particular attention is directed to the circuitry of the detector 176 which provides a unique and simple circuit for detecting mark and space frequency signals. As shown in FIG. 4, the alternating output at either the mark or space frequency from the mark or space filter 168 is applied via the lead 170 through a coupling capacitor C10 to the base electrode of a transistor Q10 which forms the active element of the amplifier 172. A resistor R10 is connected between the base electrode and a B— line to which a source of negative potential, not shown, is applied. A resistor R11 is connected between the collector electrode of the transistor Q10 and the B— line. Resistors R12 and R13 are connected respectively between the base and emitter electrodes of the transistor Q10 and ground. A capacitor C11 is connected between the emitter electrode and ground. The transistor amplifier 172 is of standard design and provides its amplified output at the collector electrode thereof which is applied via a coupling capacitor C12 to a primary winding W1 of a transformer TF1 of the detector 176. The transformer TF1 has a center tapped secondary winding W2, with the center tap point being grounded. One end of the secondary winding W2 is connected to the base electrode of a transistor Q11, and the other end of the secondary winding is connected to the base electrode of a transistor Q12. The emitter electrodes of the transistors Q11 and Q12 of the detector 176 are commonly connected to ground, while the collector electrodes are commonly connected at a junction point J10. A resistor R14 is connected between the collectors of the transistors Q11 and Q12 and the B— line. A capacitor C12 is connected between the junction J10 and ground to eliminate ripple from the output of the detector circuit. A resistor R15 is connected between the junction J10 and the base of a transistor Q13. The transistor Q13 acts as the active element for the output stage 180 and is operative in a common emitter mode. The collector electrode thereof is connected through a resistor R16 to the B— line, while the base electrode at a junction J11 is coupled through a resistor R17 to a source of B+ potential, not shown. The output of the output stage is taken at the collector from the lead 60.

Assume that the mark or space filter 168 of FIG. 4 is operative to translate mark frequency signals therethrough substantially unattenuated while rejecting to a substantial extent space frequency signals. Thus, the input signals applied to the base of the transistor Q10 of the amplifier 172 will be alternating signals at mark frequencies at a predetermined amplitude level. Amplified mark frequency signals appear at the collector electrode of the transistor Q10 and are applied via the coupling capacitor C12 to the primary winding W1 of the transformer TF1. The alternating mark frequency signals applied to the primary winding W1 are translated to the secondary winding W2 and thus to the base electrodes of the transistors Q11 and Q12 of the detector 176. If the voltage appearing across the base-emitter junction of the respective transistor Q11 or Q12 exceeds the threshold level thereof, the transistor will be rendered conductive.

The gain of the amplifier 172 is so selected that the magnitude of the voltage output appearing at the secondary winding W2 in response to the mark signals is sufficient to turn on the respective transistors Q11 and Q12 when the negative half-cycle of this voltage is applied to the base electrodes thereof. However, for space frequency signals which have been substantially attenuated by the filter 168, the gain of the amplifier 172 is insufficient to provide a sufficient voltage at secondary winding W2 to exceed the threshold levels of the transistors Q11 and Q12. The voltage applied to the bases of the transistors Q11 and Q12 being below the threshold level thereof will thus be insufficient to render either of these transistors conductive.

The transistor Q13 of the output stage 180 is so biased via the voltage divider network including the resistors R14, R15 and R17, connected respectively between the B— line and the B+ line, and via the resistor R16, connected between the collector thereof and the B— line, that this transistor is normally conductive when the transistors Q11 and Q12 are nonconductive. Thus, when space frequency signals are being received so that the transistors Q11 and Q12 are nonconductive, the transistor Q13 will be conductive. Therefore, at the collector thereof, a substantially ground level signal will appear at the output 60, which is indicative of a space signal or accordingly a $\overline{\text{mark}}$ signal. However, when mark frequency signals are received, the transistors Q11 and Q12 will be alternately rendered conductive in response to the mark frequency signal so that the junction J10 at the collector electrodes of the transistors Q11 and Q12 will be driven to substantially ground level. Thus, the junction J11, between the resistors R15 and R17 at the base of the transistor Q13, is driven in a positive direction which biases the transistor Q13 to a nonconductive state. The turning off of the transistor Q11 causes the collector electrode thereof to acquire a negative voltage. The output at the lead 60 is hence a negative polarity voltage which is indicative of a received mark frequency signal or a $\overline{\text{space}}$ frequency signal.

Whenever space frequency signals are again received, insufficient base drive will be received by the transistors Q11 and Q12 so as to be nonconductive. Thus, the collector electrodes thereof will be driven in the negative direction to cause the voltage at the junction J11 with respect to ground to be driven in the negative direction which will cause the transistor Q13 to again be rendered conductive. This will cause the output at the collector thereof, at the lead 60, to be again at a substantially ground level indicative of a space signal.

It can be seen that the just described detector circuit senses the presence of mark frequency signals and provides a unidirectional output therefrom indicative of this mark frequency signal. Whenever space frequency signals are received a unidirectional output indicative of a space signal is provided which is the logical inverse of the mark frequency signal. If a silicon transistor such as the 2N508A type is utilized, the circuit will function as described if the mark frequency signals are selected to have an amplitude in excess of the base-emitter threshold value thereof of approximately 0.7 volt, and if the space frequency signals are attenuated to have a value less than that indicated. An additional advantage has been found in differentiating between mark and space signals, in that, whenever power is being drawn in the detector circuit when mark frequency signals are being received to render the transistors Q11 and Q12 conductive, the voltage appearing at the base with respect to ground thereof appears to have a squared increase in magnitude due to the voltage square of the power being drawn by the transistors Q11 and Q12. However, with no power being drawn when receiving space signals, the square of the voltage is not present and thereby does not tend to render the transistors Q11 and Q12 conductive.

An additional mechanism enters into the mark-space differentiation. As seen at the primary winding W1 of the transformer TF1, it appears that there is an open circuit at the secondary winding W2 thereof whenever space frequency signals are being received. However, whenever mark signals are being received to render the transistors Q11 and Q12 conductive, a substantial short circuit appears across the secondary winding W2 which is reflected to the winding W1 which tends to reduce the amplitude of any received mark frequency signals. However, by selecting the gain for the amplifier 170, mark frequency signals can be made of sufficient amplitude to still render the transistors Q11 and Q12 conductive when received. However, if certain space frequency signals should be of excessive amplitude, the short circuit reflected from the secondary winding W2 will tend to decrease their amplitude to a level which probably will not be effective to supply sufficient voltage to the transistors Q11 and Q12 to turn them on. Thus, another mechanism is utilized to provide the discrimination between mark and space frequency signals.

It should be noted, of course, that the detector as described can be utilized to detect space frequency signals rather than mark frequency signals by the election to filter out mark frequency signals by the mark or space filter 168. Also, NPN type transistors can be utilized rather than PNP types as shown with appropriate changes in the polarity of the operating DC sources. Of course, other modifications in the logical output appearing at the output 60 of the output stage 180 can be made.

Ring detector

Figure 5:
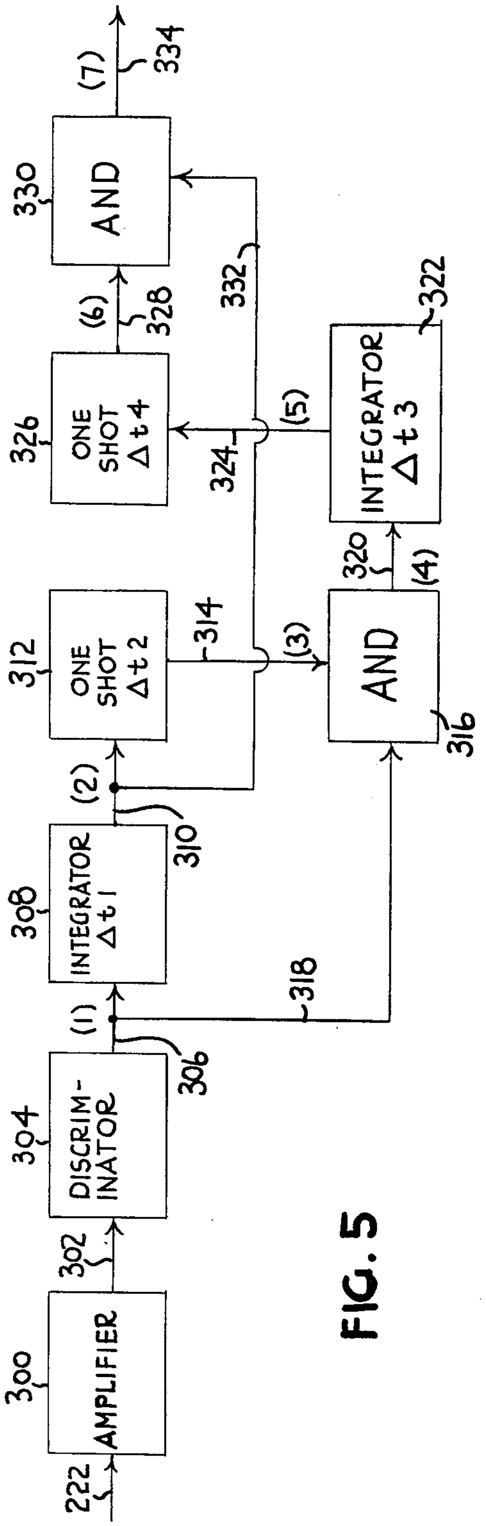
FIG. 5 is a more complete block diagram of the ring detector as shown in FIG. 1.

FIG. 5 shows a more detailed block diagram of the ring detector 222 of the automatic answer mechanism 16 shown in FIG. 1. As previously explained it is highly desirable to be capable of automatically answering the telephone so that incoming information from the distant computer center may be received and recorded without the necessity of an operator monitoring the system. However, it is highly undesirable if the ring detector functions in response to spurious ringing signals on the telephone or other spurious ambient noises in the area. Therefore, it is necessary that the auto-answering mechanism 16 function only when a true ringing signal is received on the telephone channel in use. This is accomplished through the use of the apparatus as shown in FIG. 6 which operates on the basis of the time sequence of ringing, silence and ringing as typically used for instigating a call on a standard telephone.

Figure 6:
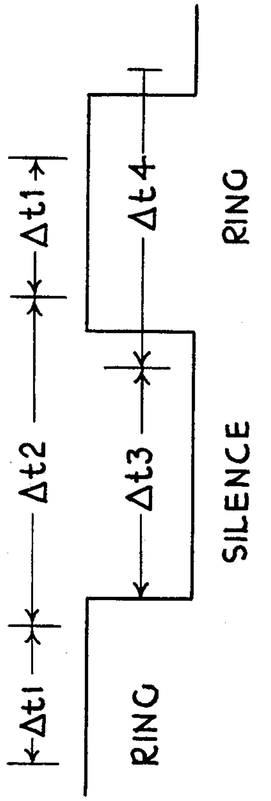
FIG. 6 is a waveform diagram used in explaining the operation of FIG. 5.

FIG. 6 shows a time plot of the occurrence of ring and silence in a typical telephone ringing sequence. Thus, as shown in FIG. 6, a ringing signal which has an alternating waveform of some predetermined frequency or frequencies occurs for some predetermined time, which, for the purpose of analysis, is shown to be less than $\Delta t1$ but greater in length than $\Delta t4$. Between the ringing signals a period of silence occurs which is shown in FIG. 6 to have a time period larger than $\Delta t2$ but shorter than the time period $\Delta t3$. The apparatus as shown in FIG. 5 functions to recognize that a true ringing signal, as shown in FIG. 6, has been received by the auto-answer mechanism 16 of FIG. 1 and performs the necessary logical steps to provide an output therefrom to activate the auto-answer mechanism 16 to complete the telephone channel between the distant communication center and the portable communication terminal.

Assume in FIG. 5 that a ring signal is received on the lead 222 from the contact microphone 110 of FIG. 1. The lead 222 is connected to an amplifier 300 which is the first stage of the ring detector. The amplifier 300 amplifies the ring signal to a predetermined level and supplies an output at a lead 302 to a discriminator 304. The discriminator 304 provides a logical output (1) at its output lead 206. The logical output (1) is indicative of whether there is ringing or silence at the input of the discriminator 304. For example, if ringing occurs the discriminator will be providing a ring output and if silence is occurring a no ring output will be provided at (1).

An integrator 308 is provided which receives the logical output (1) of the discriminator 304 from its output lead 306. The integrator 308 is indicated to have an integrating period of $\Delta t1$ and provides a logical output (2) at an output lead 310. The logical output (2) indicates that the telephone rang for a time period of at least $\Delta t1$ as indicated in FIG. 6. The logical output (2) from the integrator 308 is applied via the lead 310 to a one-shot circuit 312 which supplies at an output lead 314 a logical output (3). When and if the logical output (3) of the one-shot circuit 312, which is indicated by the time period $\Delta t2$, occurs in response to the logical input (2), this indicates that the telephone rang for a time period of $\Delta t1$ at a time period $\Delta t2$ or less ago.

The logical input (3) is then applied via the lead 314 to an AND circuit 316 which has as its other input the (1) logical output of the discriminator 304, which is applied to the AND circuit 312 via a lead 318. For the AND circuit 316 to provide its logical output (4) at its output 320, it is necessary that both a logical output (1) and the logical output (3) be supplied thereto. Upon the occurrence of both the logical outputs (1) and (3) being supplied to the input of the AND gate 316, the logical output (4) appears. The logical output (4) is indicative that the telephone rang for a time period of at least $\Delta t1$, no more than the time period $\Delta t2$ ago and is not presently ringing. The logical output (1) supplies the additional sequence information that at the time under consideration the telephone has ceased ringing and is in a silence period.

The logical output (4) of the AND gate 316 is applied via a lead 320 to an integrator 322 which supplies a logical output (5) at a lead 324. The integrator 322 is shown to have a time constant $\Delta t3$ after which the logical output (5) is to be supplied. The appearance of the logical output (5) is thus indicative of the following: that the telephone rang for a time period of at least $\Delta t1$, no more than a time $\Delta t2$ ago, is not ringing now and has not rung for a time period of at least $\Delta t3$. The time period $\Delta t3$ is indicated in FIG. 6. The logical output (5) is applied to a one-shot circuit 326 via the lead 324. The output of the one-shot circuit 326, designated by the time period $\Delta t4$, defines a logical output (6) which is provided at an output lead 328 of the one-shot circuit 326. The logical output (6) of the one-shot circuit 326 demonstrates the following: that the telephone rang for a time period of at least $\Delta t1$, no more than a time period $\Delta t2$ ago, is not presently ringing, has not rung for a time period of at least $\Delta t3$, and that which happened at the logical output (5) has occurred no more than a time period $\Delta t4$ ago. The logical output (6) is applied via the lead 328 to a second AND gate 330. The other input to the AND gate 330 is the logical output (2) from the integrator 308 which is applied to the AND circuit 330 via a lead 332 coupled to the output of the integrator 308. The output of the AND gate 330 is provided at a lead 334 that supplies the final logical output (7) which is indicative of the fact that a true ring signal has been received at the input lead 222 to the ring detector and that the telephone should be answered. More particularly, the logical output defines that: the telephone rang for a time period of at least $\Delta t1$, stopped ringing for a time period of at least $\Delta t3$ but not more than $\Delta t2$, and then rang again for a time period of at least $\Delta t1$ no more than a time period $\Delta t4$ later.

It can thus be seen by comparison with the time sequence plot of FIG. 6 that the circuitry as described in FIG. 5 has sensed that a true ring signal has been received and that the telephone should be answered to complete the communicative link therebetween. If any of the sequence of operation does not occur during the indicated time periods, the logical output (7) will not be provided therefore indicating that only a partial ring or some malintended ringing has been received. The use of the logical sequence of the telephone ringing and silence time periods greatly limits misanswering by the autoanswering mechanism 16 in comparison to systems which utilize such techniques as sensing the frequency of ring or other audio-sensing techniques. The time periods $\Delta t1$, $\Delta t2$, $\Delta t3$ and $\Delta t4$ can, of course, be independently adjusted to accommodate the particular ring sequence of a given telephone. In such a manner, the ring detector can be made very sensitive to the particular ring of the associated telephone for increased sensitivity of response to a true ring signal while eliminating spurious ones.

Although the present invention has been described with a certain degree of particularity, it should be understood that the present disclosure has been made only by way of example and that numerous changes can be made in the details of construction and the combination and arrangement of elements, components, and circuitry without departing from the scope and the spirit of the present invention.

I claim :

1. A portable computer terminal for communicating with a computer located at a distant facility by transmission and reception of information over conventional telephone channels via a standard telephone, the combination of:

input means for converting information to be transmitted into electrical signals, modulating means adapted to transmit audio frequency coded signals in response to said electrical signals, handset means adapted to house the telephone handset of said telephone and to convert said coded signals to output sounds for transmission by said telephone channels to said computer and responsive upon reception of sound transmitted from said telephone channels based on information transmitted from said computer to convert said received sounds to audio frequency coded signals, demodulating means adapted to receive coded signals from said handset means and to convert said coded signals to electrical signals, display means selectively responsive to said electrical signals from said input means and said demodulating means for displaying the information transmitted and the information received respectively, control means coupled to said modulating means and said demodulating means and adapted when activated to permit said modulating means to transmit audio frequency signals, and switch means responsive to the placement of said telephone handset in said handset means to activate said control means whereby said modulating means and said demodulating means may be operated to transmit information applied thereto.

2. The combination as recited in claim 1 wherein:

said input means comprises a power supply coupled to a teletypewriter keyboard mechanism;

said display means comprises a teletypewriter print-out mechanism; and said coded signals are coded according to a teletypewriter code including mark and space signals.

3. The combination as recited in claim 1 further including automatic answering means disposed adjacent said telephone and responsive to signals of said telephone to couple said telephone to said distant facility.

4. The combination as recited in claim 1 further including audio amplifying means coupled to said demodulator means and speaker means coupled to said audio means for audiably monitoring incoming information from said computer.

5. The combination as recited in claim 1 further including termination means coupled to said demodulator means and responsive to a received termination signal from said computer to prevent further signals from said demodulator means from being displayed by said display means.

6. The combination as recited in claim 5 further including termination indicator means coupled to said termination means and adapted to indicate to a user when a termination signal has been received by said termination means and that the information being transmitted from said computer has been terminated.

References Cited

UNITED STATES PATENTS

| | | | |
|---|---|---|---|
| 2,823,261 | 2/1958 | Zipf | 179—3 |
| 2,186,899 | 1/1940 | D'Humy et al. | 179—4 |
| 2,903,517 | 9/1959 | Ridings | 179—4 |
| 3,113,176 | 12/1963 | Doktor et al. | 179—3 X |
| 3,351,919 | 11/1967 | Milford. | |

ROBERT L. GRIFFIN, Primary Examiner

J. A. BRODSKY, Assistant Examiner

U.S. Cl. X.R.

179—2